(12) United States Patent
Slinger (10) Patent No.: US 7,218,435 B2
(45) Date of Patent: May 15, 2007

(54) RECONFIGURABLE SPATIAL LIGHT MODULATORS

(75) Inventor: Christopher William Slinger, Malvern (GB)

(73) Assignee: F. Poszat Hu, L.L.C., Wilmington, DE (US)

( * ) Notice: Subject to any disclaimer, the term of this patent is extended or adjusted under 35 U.S.C. 154(b) by 0 days.

(21) Appl. No.: 10/528,670

(22) PCT Filed: Oct. 6, 2003

(86) PCT No.: PCT/GB03/04284

§ 371 (c)(1),
(2), (4) Date: Mar. 22, 2005

(87) PCT Pub. No.: WO2004/031841

PCT Pub. Date: Apr. 15, 2004

(65) Prior Publication Data

US 2006/0050374 A1    Mar. 9, 2006

(30) Foreign Application Priority Data

Oct. 5, 2002 (GB) ................................ 0223119.9

(51) Int. Cl.
  *G02B 1/03* (2006.01)
(52) U.S. Cl. .................... 359/245; 359/246; 356/330
(58) Field of Classification Search ................ 359/245, 359/246, 247, 248, 238, 242; 356/330, 328, 356/310
See application file for complete search history.

(56) References Cited

U.S. PATENT DOCUMENTS 4,815,819 A * 3/1989 Mayhew et al. ............. 359/478

5,329,354 A * 7/1994 Yamamoto et al. ......... 356/490

(Continued)

FOREIGN PATENT DOCUMENTS

EP           0 450 644         10/1991

(Continued)

OTHER PUBLICATIONS

Cameron, et al. "Computational Challenges of Emerging Novel True 3D Holographic Displays", SPIE Conference of Critical Technnologies for Future of Computing, p. 129-140 (2000.
Haines, et al. "A technique for bandwidth reduction in Holographic Systems", Proceedings of the IEEE, pp. 1512-1513 (1967).

(Continued)

*Primary Examiner*—Timothy Thompson
(74) *Attorney, Agent, or Firm*—Marger Johnson & McCollom, P.C.

(57) ABSTRACT

This invention relates to reconfigurable spatial light modulators (SLM) incorporating a scatter plate. Computer generated diffraction patterns or holograms may be loaded on the (SLM) either as a single frame or as a series of frames for observation by an observer. In a preferred embodiment both an electrically addressable spatial light modulator (EA-SLM) and an optically addressable spatial light modulator (OASLM) are used. The (OASLM) may be formed of several smaller (OASLMs) arranged in a matrix format. The faster (EASLM) forms a light pattern on sub-areas of the large (OASLM) in turn to give a large display. The scatter plate is arranged at the output of the (SLM) nearest an observer. This scatter plate has a known characteristic and serves to increase the field of view and/or reduce the number of pixels required to give a holographic or two dimensional displays. Prior to producing a display, the diffraction patterns, holograms, or image in the computer is modified to take account of the properties of the scatter plate; a modified computer generated diffraction pattern, hologram, or image is then displayed to an observer. The system may also be used for optical switching.

17 Claims, 7 Drawing Sheets

U.S. PATENT DOCUMENTS

| | | | |
|---|---|---|---|
| 5,461,475 | A | 10/1995 | Lerner et al. |
| 5,943,145 | A | 8/1999 | Curtis et al. |
| 6,078,392 | A | 6/2000 | Thomas et al. |
| 6,859,275 | B2 * | 2/2005 | Fateley et al. ............... 356/330 |

FOREIGN PATENT DOCUMENTS

| | | |
|---|---|---|
| GB | 2330471 | 4/1999 |
| GB | 2350962 | 12/2000 |
| JP | 11014937 | 1/1999 |
| WO | WO 99/46768 | 9/1999 |

OTHER PUBLICATIONS

Komar, "Progress on the Holographic Movie Process in the USSR", SPIE vol. 120, pp. 127-144 (1977).

Allebach, "Iterative Approaches to Computer Generated Holography", Proc SPIE vol. 884, pp. 2-9 (1998).

Dallas, "Computer Generated Holograms", Topics in Applied Physics vol, 41, Chapter 6.

Search Report issued by the Great Britian Patent Office for Application No. GB 0223119.9.

* cited by examiner

RECONFIGURABLE SPATIAL LIGHT MODULATORS

FIELD OF INVENTION

This invention relates to reconfigurable spatial light modulators (SLM) on which computer generated diffraction patterns or holograms may be loaded either as a single frame or as a series of frames.

BACKGROUND

Re-configurable SLMs based on liquid crystal (and other types of) devices are widely used for controlling and manipulating optical beams. In diffractive mode they may be used for three dimensional (3D) imaging [BROWN, C V and STANLEY, M, UK Patent Application GB2330471, *Production of Moving Images for Holography*] and for routing optical signals in telecommunications networks [See for example ROSES (Re-configurable Optical Switches) website, http://www-g.eng.cam.ac.uk/photonics/rose1.html].

The SLM.modulates the complex amplitude of an incoming wave front (i.e. changes its phase and/or amplitude), which causes it to propagate in the desired manner. The SLM generally comprises a liquid crystal panel containing a number of individually addressed pixels, onto which a diffraction pattern or Computer Generated Hologram (CGH) is written [CAMERON, C D et al, SPIE Conference on Critical Technologies for the Future of Computing (San Diego, USA), July-August 2000, *Computational Challenges of Emerging Novel True 3D Holographic Displays*].

CGH 3D display systems typically use a computer to generate and/or store electronic copies of the hologram. This hologram is then replayed on an SLM which is switched to modulate (in transmission or reflection) light from a source which then passes through suitable replay optics, thereby providing a visible three-dimensional image to observers.

For many image generation applications, especially holographic 3D image generation, it is important to maximise the image size and/or the range of angles over which the image can be viewed. Conventionally, this is achieved by increasing the spatial frequency content of the hologram, which increases the achievable diffraction angle of the modulated beam and/or increasing the number of pixels in the SLM. In order to produce satisfactory images, SLMs containing of the order of $10^{10}$ pixels may be required. An increased spatial frequency is also desirable for many other applications utilising diffractive SLMs, such as optical switching.

HAINES and BRUM [Proceedings of the IEEE (Letters), p 1512-3, August 1967, A Technique for Bandwidth Reduction in Holographic Systems] proposed using a ground glass scatter plate as a means of enhancing the viewing angle without having to increase the spatial frequency content. The principle was successfully demonstrated using a conventional fixed, photographically recorded hologram of a point source hologram (note: the scatter plate is used in both the recording and re-construction stage). KOMAR [SPIE Vol 120, p 127, 1977, Progress on the Holographic Movie Process in the USSR] discussed the use of the scatter-plate technique as a means of producing holographic "movies" in which the viewing angle was big enough for a large audience to see the 3D images. He concluded that the technique caused unacceptable degradation in the image quality.

The main factor preventing the introduction of reconfigurable computer generated holograms (CGH) in many applications is the number of addressable, reconfigurable pixels required in such devices. This is particularly important in the area of 3D image generation.

To ensure adequate fields of view (FOV) and image sizes, conventional approaches typically need a CGH having a pixel count several orders of magnitude higher than that required to produce image resolutions that the human visual system can perceive. The simple relation $$FOV.I \sim n\, \lambda/4 \qquad (1)$$

(where n is the number of pixels across the display in the plane where the FOV is specified, I is image width, and $\lambda$ is the wavelength of light generating the real image) shows that, for typical applications (e.g. FOV=±30°, I=0.05 m), $\sim 10^{10}$ pixels are required to be addressed. This number is enormous. Any method allowing a pixel count reduction, without significantly compromising perceived image qualities, will have great effect on the practicality of such systems.

Statement of Invention.

The above problem of a very large pixel count is reduced, according to the present invention, by the use of a scatter plate of known feature composition together with a computer generated diffractive pattern or hologram calculated to pre-compensate for effect of the scatter plate.

According to this invention, a reconfigurable spatial light modulator system comprises:

a controller for holding a compensated pattern;

a first spatial light modulator having a plurality of addressable pixels controlled by the controller each pixel being capable of modulating incident light and collectively replicating the compensated pattern;

a scatter plate of known characteristics for scattering light from the first spatial light modulator;

optical means for directing light scattered by the scatter plate and presenting a pattern to a receiver;

the compensated pattern being related to both the scatter plate characteristics and to the pattern presented to the receiver.

The scatter plate may be a simple binary phase pseudo random diffuser and may have a number of pixels much greater than the number of pixels on the first SLM. Other formats may be used. For example multi level pseudo random devices and diffusers with periodic structures.

The first spatial light modulator may be an electrically addressable liquid crystal spatial light modulator (EASLM) operable either in transmissive or reflective mode.

The optical means may be a lens system, e.g. a Fourier Transforming lens.

The system may include a second SLM which receives modulated light from the first SLM; the scatter plate 5 is associated with the second SLM in such systems. This second SLM may be optically addressable (OASLM) having substantially the same or different number of addressable pixels as the first SLM, and may be of greater dimensions to give a magnified image or smaller dimensions to provide increased spatial frequency. Alternatively, the second SLM may be formed by a number of individual OASLMs arranged in a x,y matrix or tiled configuration. When the second SLM has a tiled configuration, then scanning means are included for directing scattered light to different tiled areas in turn.

The controller may be a computer having memory for storing basic images and calculating means for providing compensated pattern from basic images to take account of scattering by the scatter plate. The basic images may be obtained by scanning of actual objects, in a manner analogous to forming holographic images in film material, conventional holography as in U.S. Pat. No. 6,078,392, direct to digital holography, or by calculation as in computer aided design (CAD) processes. Alternatively the computer may have a memory unit for storing images previously processed elsewhere, and then read out into the SLM as required.

The system may display holographic images directly to one or more observers. Alternatively, the system may further include a receiver, which may be an array of detector elements, a bundle of optical fibres, a screen onto which an image is projected for observation by one or more observers. The light source may be ambient light, or light from a single or multiple light sources such as one or more optical fibres or lasers.

According to this invention a method of providing a holographic image to an observer includes the steps of:

providing a holographic engine for storing a computer generated hologram pattern of an image to be displayed providing a spatial light modulator having a large number of addressable pixels each capable modulating light under the control of the engine controlling the spatial light modulator so that the observer receives a holographic image;

Characterised By providing a light scattering plate of known characteristics to modify light from the spatial light modulator;

calculating and providing a compensated computer generated hologram pattern of an image to compensate for the known characteristics of the scattering plate so that an observer receives a holographic image.

The compensated CGH pattern may be calculated using direct binary search algorithm.

According to another aspect of this invention a method of increasing the range of diffraction angles from a computer designed diffraction structure includes the steps of:

providing a holographic engine for storing a computer generated pattern of a structure to be displayed;

providing a spatial light modulator having a large number of addressable pixels each capable of modulating light under the control of the engine;

Characterised By providing a light scattering plate of known characteristics to modify light from the spatial light modulator;

calculating and providing a compensated computer generated hologram pattern of a diffractive structure to compensate for the known characteristics of the scattering plate so that an increased range of diffraction angles are obtained.

BRIEF DESCRIPTION OF DRAWINGS

The invention will now be described, by way of example only, with reference to the accompanying drawing of which.

DESCRIPTION OF EMBODIMENTS

Figure 1:
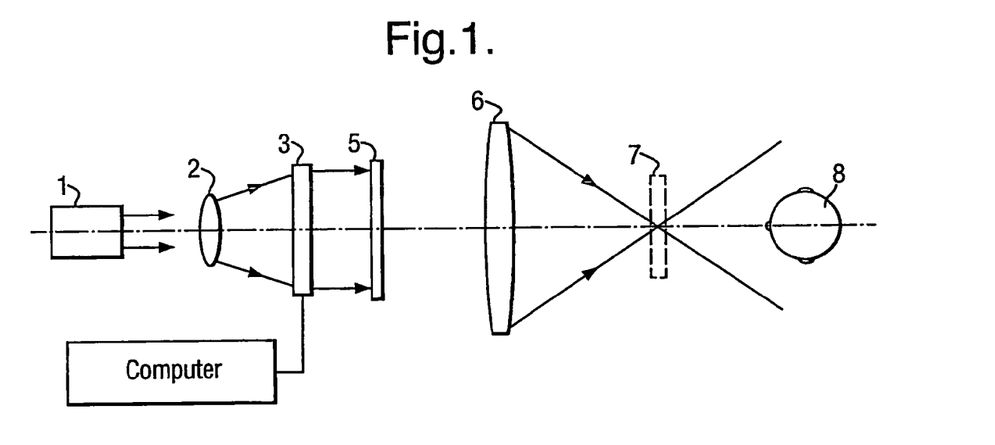
FIG. 1 shows a simple form of the invention with a single spatial light modulator and scatter plate for producing two or three dimensional images to an observer.

As shown in FIG. 1, a reconfigurable holographic display comprises a light source 1 whose output is directed through a lens 2 onto an electrically addressable spatial light modulator (EASLM) 3. This EASLM may be a liquid crystal modulator in which a layer of liquid crystal material (nematic, cholesteric, or ferro electric) is held between two glass walls. Column electrodes on one wall and row or line electrodes on the other wall form a matrix of addressable elements or pixels at electrode intersections. When a voltage is applied to a pixel, the liquid crystal material rotates under the applied electric field to modulate light transmission. High switching speeds are obtainable from ferro electric materials, and may include silicon active backplane devices.

A computer 4 controls the signals applied to the SLM 3 and may contain electronic copies of images to be displayed in both original format and modified format as discussed below.

In front of the SLM 3 is a scatter plate 5. This is shown as separated from the SLM 3, but in many cases it will be in contact with the SLM and may be formed on the output wall of the liquid crystal cell forming the SLM 3. In another embodiment, a lens or optical element (not shown) may be located between the SLM 3 and scatter plate 5.

Figure 4:
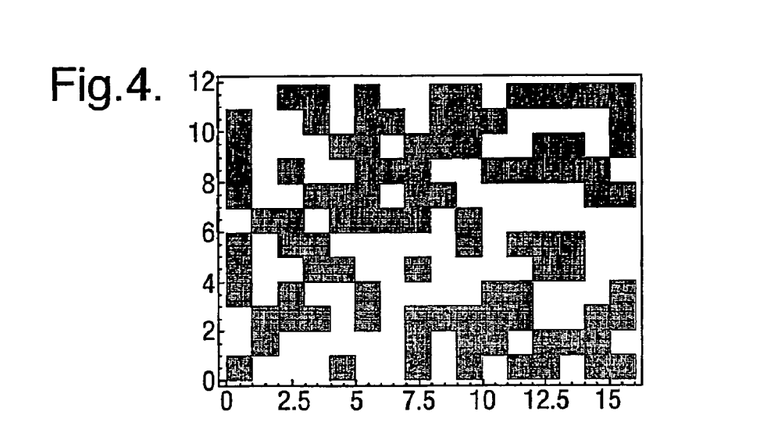
FIG. 4 shows a small section of a scatter plate having a pseudo random binary phase distribution.
Figure 5:
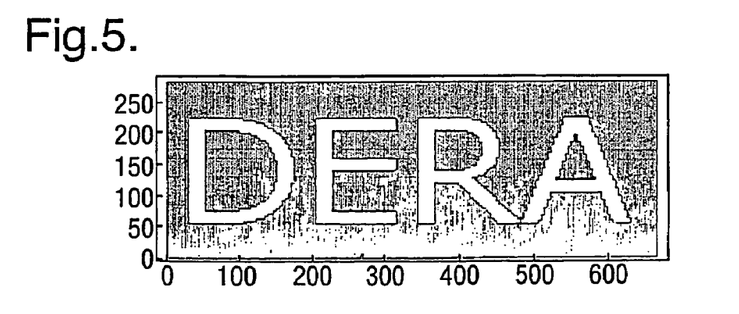
FIG. 5 shows an example of an image to be displayed, namely the letters DERA.

Part of one example of scatter plate 5 is shown in FIG. 4 to comprise a matrix of squares or pixels; each pixel is shown as either transparent or opaque representing either a zero or a $\pi$ phase delay giving a pseudo random binary phase distribution pattern used to generate the image of the letters DERA shown in FIG. 5. Surface features on the scatter plate 5 may be of the same or different size from the pixel size of the SLM 3 depending on the layout of SLM 3 and plate 5. For the specific example of FIG. 4 each pixel is half the linear dimensions of a pixel on the SLM 3.

A lens system 6 transforms light from the scatter plate 5 to present a three dimensional (3-D) holographic image 7 to an observer 8. This image 7 appears to float in space in front of the observer 8 at an enlarged size in comparison with a system without a scatter plate 5.

Figure 6:
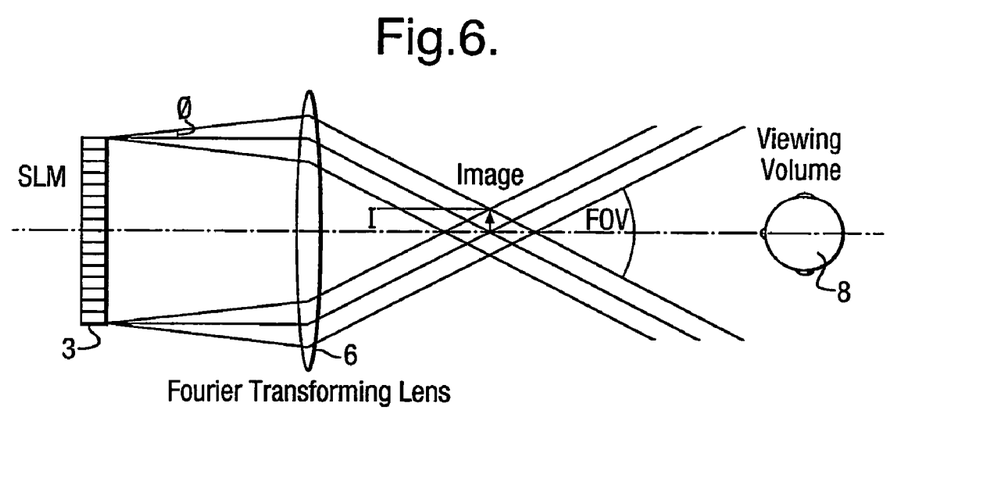
FIG. 6 is a schematic of Fourier based 3-D image generation using CGH, it shows the relationship between the maximum diffraction angle from a SLM, the SLM size and the image size and field of view (FOV)
Figure 7:
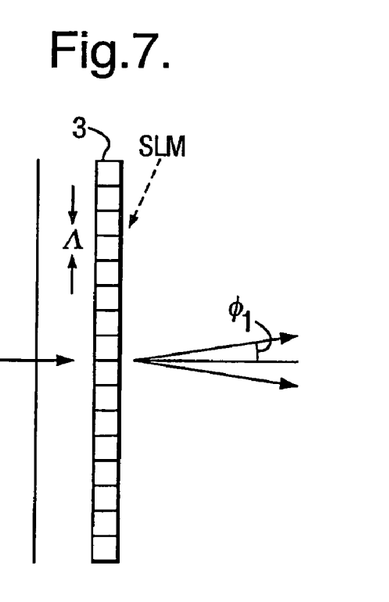
FIG. 7 shows the diffraction angle from an SLM of FIG. 6.
Figure 8:
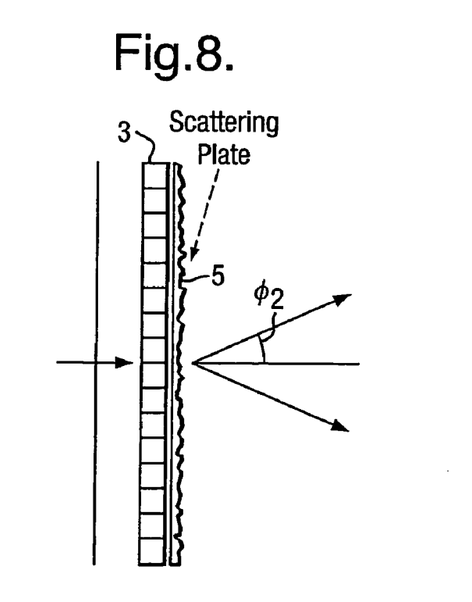
FIG. 8 shows the diffraction angle from the present invention with a scatter plate.

Some benefits of the scatter plate 5 can be seen by comparing FIGS. 6 and 7 with that of FIG. 8. In FIGS. 6, 7 light from a SLM 3 passes direct through a lens 6 to an observer 8 with diffraction angle $\phi_1$. The scatter plate 5 in FIG. 8 increases $\phi_2$ as shown to improve the image size I.

These FIGS. 6, 7, 8 show how the diffraction angle $\phi$ from a CGH limits the size of the image (and therefore the FOV.I product in equation 1) produced in a conventional, Fourier based CGH system.

The value of $\phi$ is given by the grating equation as:

$$\sin \phi = \lambda/(2\ Mp) \quad (2)$$

where p is the pixel pitch on the SLM, and M is given below.

The above shows that larger diffraction angles $\phi$ can be produced for a given number of addressable pixels (or, alternatively, the same value of FOV.I product for a smaller number of addressable pixels) by combining the reconfigurable modulator 3 (SLM) with a fixed scattering plate (FIG. 8).

If the scattering plate 5 has spatial frequencies of M times the SLM 3, then, for the same number of addressable pixels n across the SLM:

$$FOV.I = Mn\lambda/4 \quad (3)$$

The number of pixels that have to be addressed for a given FOV.I product is thus reduced by $M^2$, assuming a unity aspect ratio SLM. So, for M=10 and the FOV.I product in the example above, only $10^8$ addressable pixels in the SLM would be required.

Figure 11:
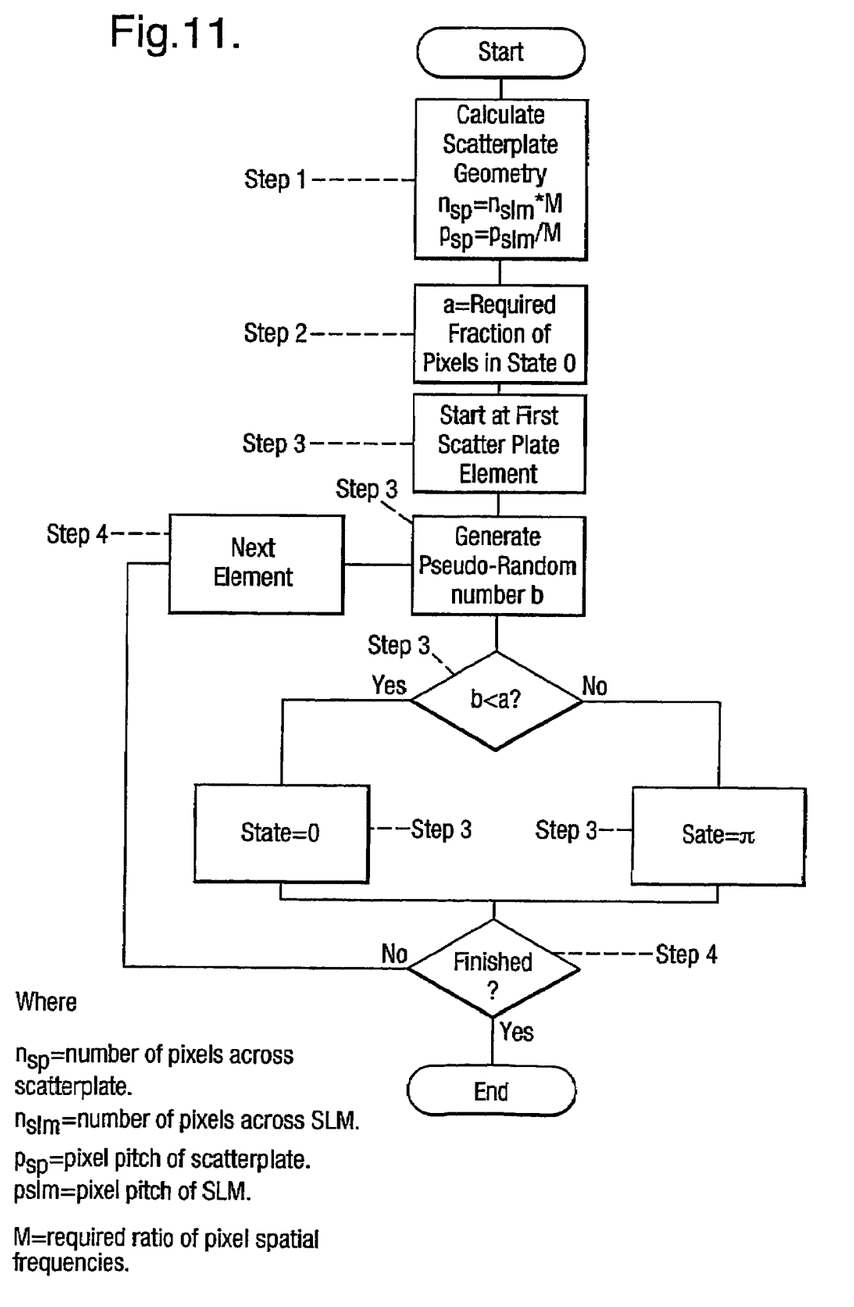
FIG. 11 shows a flow chart for producing a scatter plate capable of doubling the size of a two dimensional image generated from a binary phase Fourier CGH.

A scatter plate design may be used to increase the size of a 2D image generated from a e.g. binary phase, Fourier CGH. For example the scatter plate of FIG. 4 may be produced by the flow chart steps shown in FIG. 11, as described below:

Step 1. Calculate scatter plate geometry, e.g. to double available range of diffraction angles, the scatter plate requires a pixel spatial frequency of twice that of the associated spatial light modulator.

Step 2. Specify the required fraction of pixels in state 0

Step 3. Starting at the first pixel element, randomly assign a state of 0 or $\pi$ using a probability specified in step 2.

Step 4. Repeat step 3 for all locations on the scatter plate

In FIG. 11:—

Figure 9:
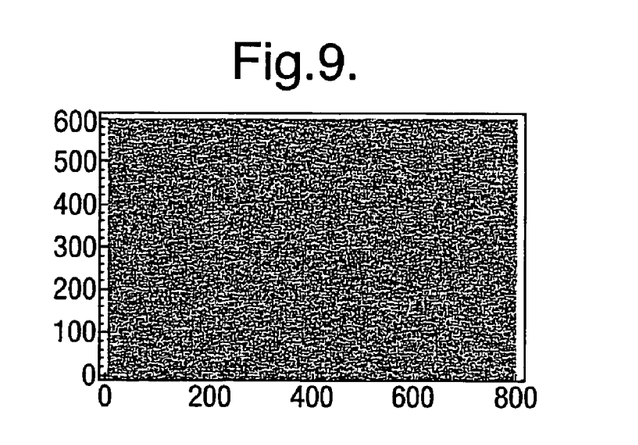
FIG. 9 shows a computer generated pattern for applying to a SLM in order to produce the display of FIG. 5 in the system shown in FIG. 6 which does not use a scatter plate.
Figure 10:
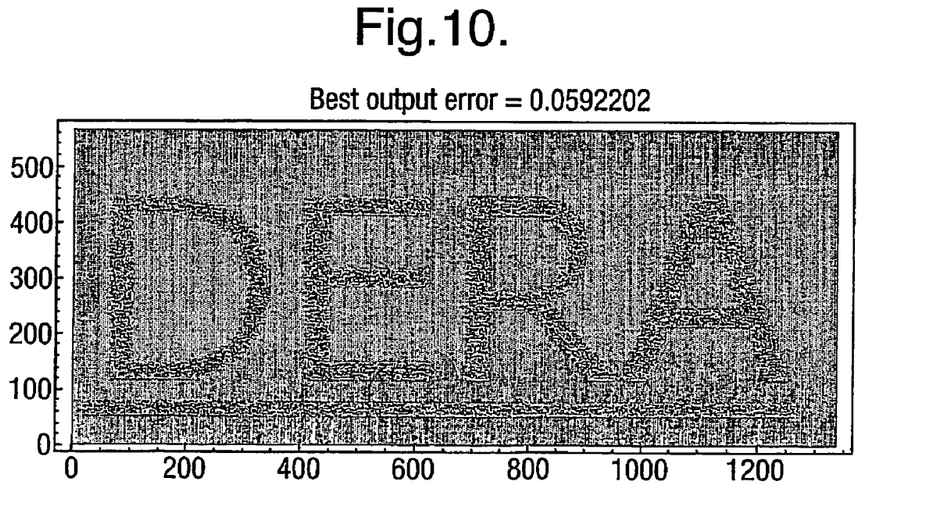
FIG. 10 shows an example of an image displayed using a scatter plate as in FIG. 8, the area of display is about four times that of the similar image of FIG. 5 displayed without the use of a scatter plate by the arrangement of FIG. 6.

$n_{sp}$=number of pixels across the scatter plate
$n_{sim}$=number of pixels across the SLM
$p_{sp}$=pixel pitch of scatter plate
$P_{sim}$=pixel pitch of SLM
M=required ratio of pixel spatial frequencies FIG. 9 shows a computer generated pattern that can be used with the system of FIG. 6 (no scatter plate) to control the SLM 3 to form the image shown in FIG. 5 to an observer. The image of FIG. 9 is meaningless to an observer unless transmitted through a system such as that of FIG. 6. There are several known ways of producing the pixel distribution of FIG. 9. These include W J Dallas, Topics in Applied Physics vol 41, chapter 6, Computer generated holograms.

When the scatter plate 5 of FIG. 4 is included as in FIG. 1, then the computer generated image of FIG. 9 needs to be modified from that of FIG. 9. The SLM pattern may be calculated using DBS (direct binary search, basic DBS reference: Allebach J P, "Iterative approaches to computer generated holography" Proc. SPIE vol. 884, p. 2–9, (1988)). This modification may be by the DBS algorithm shown in FIG. 12 as follows:—

Figure 12:
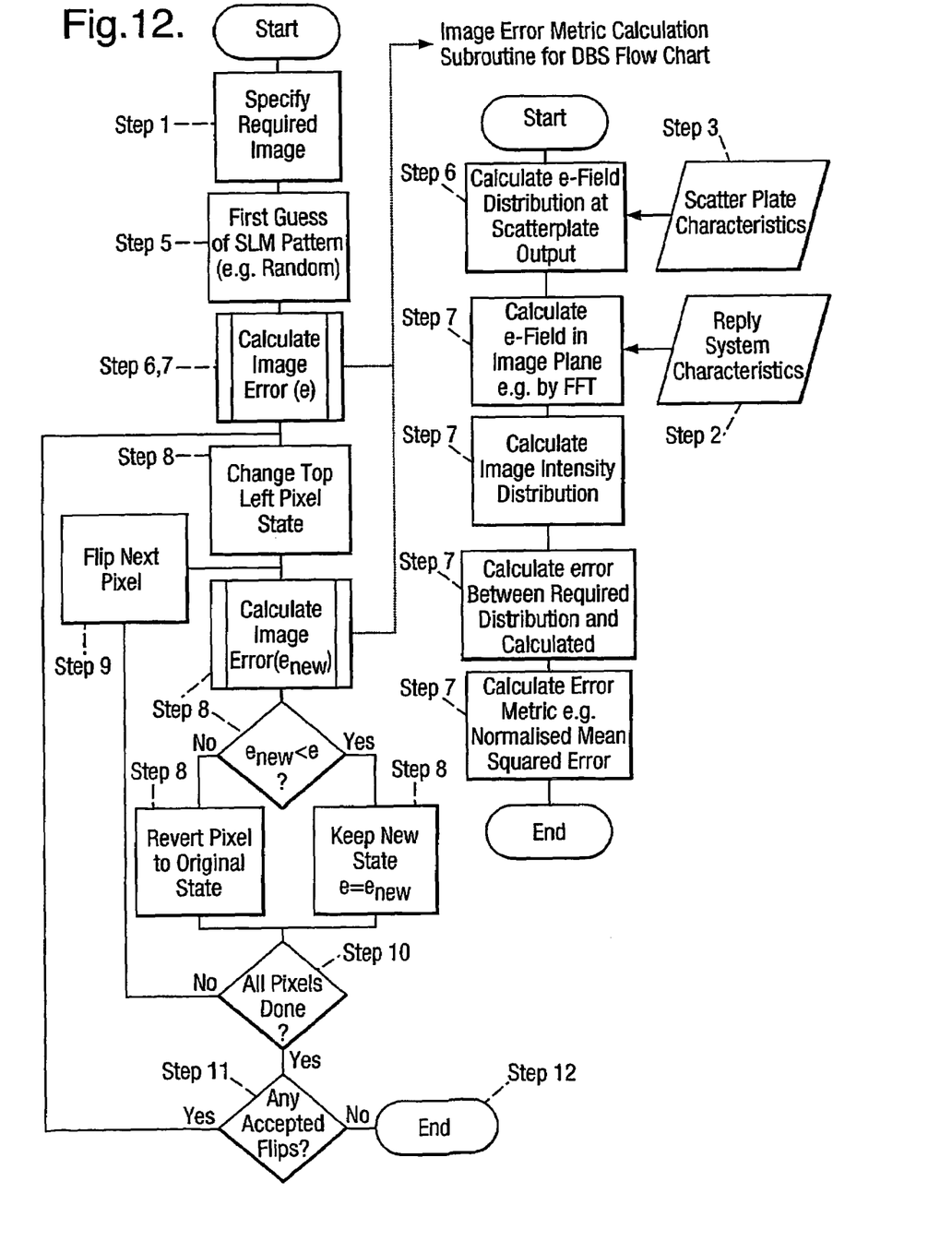
FIG. 12 shows a flow chart for calculating a compensated pattern to compensate for scattering by the scatter plate.

Step 1. Specify intensity distribution of the image to be generated by CGH/scatter plate combination (the "target" intensity distribution, e.g. FIG. 5), and the region of interest in the optical Fourier transform plane 7 of the system Step 2. Specify system parameters (wavelength of operation, focal length of Fourier lens system 6, pixel pitch of CGH)

Step 3. Specify scatter plate characteristics e.g. a pseudo-random, binary phase distribution, each scatter plate pixel having a retardation of $\pi$ or 0 at the design wavelength, with a pixel pitch of half that of the CGH in the x and y directions (see FIG. 4).

Step 4. Use DBS (direct binary search) algorithm to optimise the CGH pixel distribution, such that when replayed through the scatter plate 5, the system delivers the required image having twice the lateral size (4× the area) of that which would be possible from the CGH alone. DBS as follows:

Step 5. Start with random binary phase pattern on CGH.

Step 6. Assuming on axis replay of the CGH with a plane wave, and that the CGH is in contact with the scatter plate, determine the electric field distribution at the output surface of the scatter plate, sampled at the centre of each scatter plate pixel. This can be done using scalar transmittance theory, for example, if the pixel spacings are large compared to the wavelength of light used, and the CGH and scatter plate are sufficiently close enough together. The number of sample points (and complex electric field values) will be 4× the number of pixels in the CGH, in this example.

Step 7. Take the fast Fourier transform of the array of electric field values at the output of the scatter plate. This gives the electric field distribution in the image plane. The modulus squared of this is the intensity in the image plane. Compare this intensity distribution in the region of interest to the target intensity distribution, using some numerical metric e.g. normalised mean squared error (DBS reference above). Call this the error e.

Step 8. Flip the top left pixel of the CGH distribution e.g. if it was of value $\pi$, change its value to 0, if it was of value 0, change it to $\pi$. Repeat steps 6 and 7 to determine a new error value $e_{new}$. If $e_{new}$<e, then accept the pixel flip and set $e=e_{new}$. Otherwise flip the CGH pixel back to its original value.

Step 9. Flip the next pixel (in e.g. lexicographical order) in the CGH and repeat step 8.

Step 10. Repeat step 9 and continually cycle through all the CGH pixels in the same manner.

Step 11. Repeat steps 8 to 10 until there are no more accepted pixel flips.

Step 12. The resulting CGH pattern will be a local solution to the problem of determining the CGH pattern required to give the target image distribution when replayed through the scatter plate.

Incorporating the scatter plate 5 produces advantages as follows:

The image size can be increased without increasing the number of pixels in the SLM, which increases the flexibility of the system.

There is some perceived degradation in image quality, but this can be controlled, therefore the technique is appropriate for high quality imaging applications.

The number of pixels needed to achieve a certain image size can be reduced, therefore simpler more cost effective SLMs may be employed.

For a given image size, the data storage and data bandwidth requirements for re-configurable CGHs are reduced, thereby making them more practical to implement.

For a given data storage and bandwidth capacity, the image size available from re-configurable CGHs is maximised, thereby producing a more flexible system.

Whilst calculating a compensated pattern, the computer may also provide correction or compensation for known aberrations in the various optical components.

Figure 2:
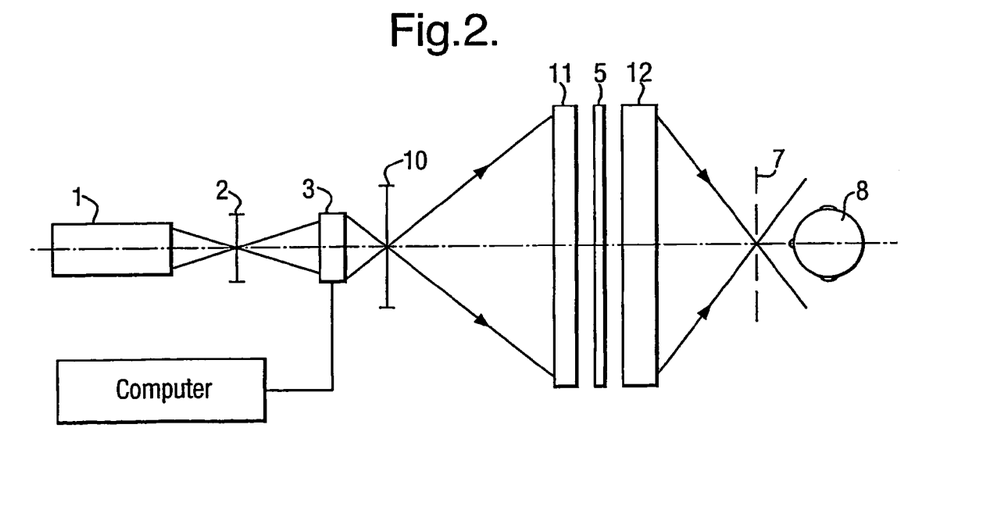
FIG. 2 shows another form of the invention having an electrically addressable spatial light modulator (EASLM) and an optically addressable spatial light modulator (OASLM) of larger dimensions than the EASLM giving an enlarged display.

FIG. 2 is a simple extension of the arrangement of FIG. 1 with like components given like reference numerals. In front of the EASLM 3 is a magnifying lens 10, an optically addressable spatial light modulator (OASLM) 11, a scatter plate 5, and a further lens 12. The OASLM is a known component and may comprise a layer of a liquid crystal material between two glass walls. One wall carries a transparent sheet electrode (or strip-like electrodes) and the other wall carries amorphous silicon photosensitive areas corresponding to pixel areas.

When light from the EASLM is incident upon a photosensitive area, a voltage is generated to apply an electrical field across the liquid crystal layer under that area, thereby modifying its transmission properties. Thus a pattern of light from the EASLM is transmitted through the OASLM 11 and scatter plate 5 combination to an observer 8 at a greatly increased size. As before the scatter plate 5 is shown separate from the OASLM 11 but in practice will be close to or formed as part of the front face of the OASLM. In another embodiment, the scatter plate may be on the light receiving face of the OASLM.

A description of EASLMs and OASLMs used with holographic displays is described in patent application EP-1064651, PCT WO-00/2350472, GB98/04996.

Figure 3:
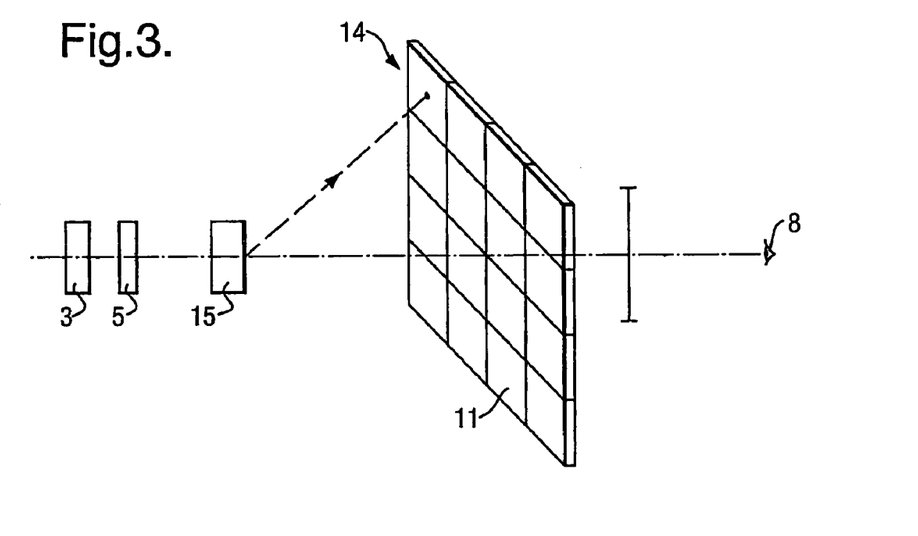
FIG. 3 shows a modification of FIG. 2 in which the OASLM is formed of several OASLMs connected together in a tiled manner, with optical scanning means to direct light from the EASLM to each tile of the OASLM in turn.

FIG. 3 is a further extension of FIG. 2. In this FIG. 3 the OASLM 14 is formed by sixteen separate OASLM devices each being one tile 11 in a 4×4 matrix or tiled arrangement; other size matrixes can be formed. Each separate tile 11 is similar to that of the OASLM of FIG. 2 and has the same number of pixels, as does the EASLM 3. Between the scatter plate 5 and OASLM 14 is an optical arrangement 15 for directing the output of the scatter plate 5 to one of the tiles 11 at a time, and to all the tiles in a sequence; e.g. in a raster manner. By this means a large display formed of many separate images can be formed on the OASLM 14. Such an arrangement relies on the high speed of the EASLM 3 and visual persistence by the observer 8. Additionally, the tiles 11 may be bistable or have a slow turn off time to reduce flickering. The system of FIG. 3 is similar to that in GB2330471 with the addition of the scatter plate 5. Images may be observed either by transmission of light through or reflection from the OASLM 14.

One potential advantage of the OASLMs 11, 14 are that they may modulate light at wavelengths other than that of the light source 1. For example the light source 1 may generate light of a narrow wavelength range to control the EASLM 3 and hence the OASLMs 11, 14. These OASLMs 11, 14 may then transmit or reflect light from additional sources (not shown), either white light or red, blue and green light to provide a colour display e.g. in a frame or line sequential manner.

The scatter plate 5 of FIG. 4 is a simple binary phase pseudo random diffuser. Other formats may be used. For example multi level pseudo random devices and diffusers with periodic structures.

The examples in FIGS. 1–10 above are concerned with holographic images. The invention is also applicable to two dimensional displays or to optical switching.

When used for two dimensional displays, larger images can be shown without increased pixellation or the same size displayed with reduced pixel numbers in the SLM 3. The enlarged image may be directed onto a reflective (or transmissive) screen for viewing by several observers; or the enlarged image viewed by an observer 8 as in FIGS. 1 and 2.

Figure 13:
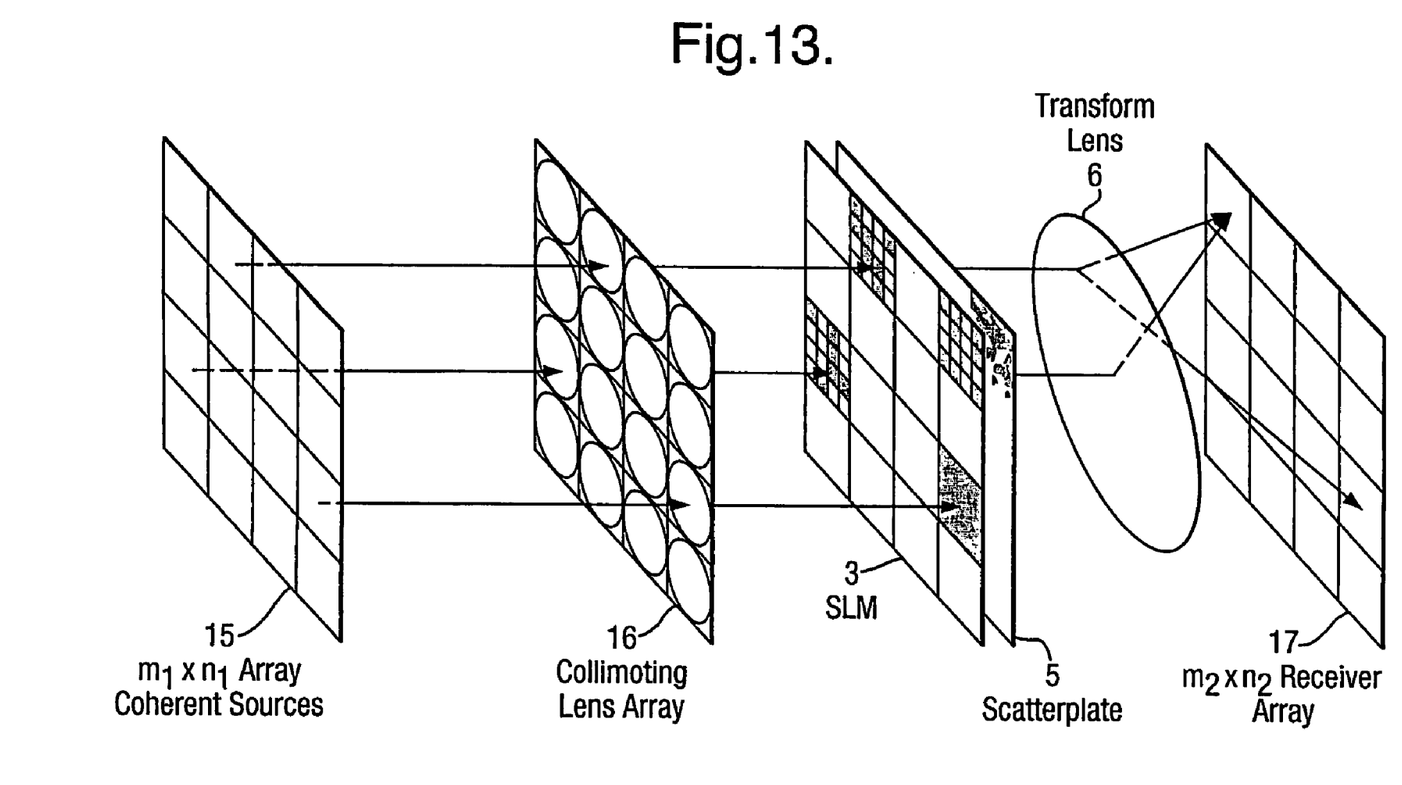
FIG. 13 shows an example of an optical switching device using a scatter plate.

In the optical switching device shown in FIG. 13, an array of $m_2 \times n_2$ detectors (17) may be arranged at the image plane (instead of an observer 8) and receive a signal on any one of its detectors, from the SLM 3. The array of detectors may be a bundle of optical fibres, each capable of receiving light separately from one of $m_1 \times n_1$ optical fibres or diode lasers (15) behind the SLM 3. A collimating lens array (16) may be used to direct the light from the source array onto the SLM. The benefit of the scatter plate 5 is that of increasing the available diffraction angle for a given SLM, therefore increasing fan out capability or allowing different packaging layout e.g. a larger detector spacing or shorter SLM to detector distance. The computer may be a memory chip storing pre-calculated SLM patterns for each of the connections required.

The invention claimed is:

1. A reconfigurable spatial light modulator system arrangement comprising:
   a controller for holding a pattern;
   an incident light source;
   at least one spatial light modulator, the at least one spatial light modulator having a plurality of pixels, each pixel being capable of modulating incident light and collectively replicating the pattern;
   a scatter plate of known characteristics in an optical path between the incident light source and an observer or detector the scatter plate having a number of surface features greater than the number of pixels on the at least one spatial light modulator;
   the arrangement being adapted to present light propagating from the at least one spatial light modulator to the observer or detector; and
   the pattern being a pattern compensated according to the scatter plate characteristics.

2. The system of claim 1 wherein the controller stores pre-calculated compensated pattern for each pattern to be displayed.

3. The system of claim 1 wherein the controller is a computer with storage and means for calculating a compensated pattern for each pattern to be displayed.

4. A reconfigurable spatial light modulator system arrangement comprising:
   a controller for holding a pattern;
   an incident light source;
   at least one spatial light modulator, the at least one spatial light modulator having a plurality of pixels, each pixel being capable of modulating incident light and collectively replicating the pattern;
   a scatter plate of known characteristics in an optical path between the incident light source and an observer or detector;
   the arrangement being adapted to present light propagating from the at least one spatial light modulator to the observer or detector; and
   the pattern being compensated according to the scatter plate wherein the controller is a computer with storage and means for calculating both a computer generated hologram from a human readable format and a compensated pattern for each pattern to be displayed.

5. The system of claim 1 wherein at least one of the at least one spatial light modulators is an electrically addressable liquid crystal spatial light modulator (EASLM) operable either in transmissive or reflective mode.

6. The system of claim 5 wherein the system comprises at least two spatial light modulators arranged such that light from a first spatial light modulator is directed towards a second spatial light modulator, the second spatial light modulator being an optically addressable spatial light modulator.

7. The system of claim 6 wherein the optically addressable spatial light modulator is a plurality of individual optically addressable spatial light modulators connected together in a tiled manner.

8. The system of claim 7 and including a scanner for scanning light from the electrically addressable spatial light modulator onto each individual modulator in a sequence.

9. The system of claim 7 wherein the plurality of individual modulators is operable either in transmission or reflective mode.

10. The system of claim 1 wherein the incident light source comprises one or more light sources at one or more different wavelengths or broadband (white) light.

11. The system of claim 1 wherein the incident light source is a single light source adapted to provide light to all pixels in at least one of the spatial light modulators.

12. The system of claim 1 wherein the incident light source is a laser adapted to provide light to all pixels in at least one of the spatial light modulators.

13. The system of claim 1 wherein the incident light source comprises one or more optical fibres.

14. The system of claim 1 and further including a detector.

15. The system of claim 14 wherein the detector is an array of detector elements.

16. The system of claim 14 wherein the detector is a bundle of optical fibres.

17. The system of claim 14 wherein the detector is a screen for receiving an image and viewing by an observer.

* * * * *